United States Patent [19]
Meacham

[11] 3,777,224
[45] Dec. 4, 1973

[54] MOUNTING MEANS FOR TRIM PLATE OF PANELBOARD

[75] Inventor: James Frank Meacham, Bellmar, N.J.

[73] Assignee: I-T-E Imperial Corporation, Philadelphia, Pa.

[22] Filed: Sept. 5, 1972

[21] Appl. No.: 286,143

[52] U.S. Cl.................... 317/120, 220/24.3, 49/168
[51] Int. Cl. .............................................. H02b 1/04
[58] Field of Search.................... 317/104, 105, 107, 317/111, 112, 119, 120; 220/55, 55.1, 3.8, 24.3; 49/168; 292/256, 256.5, 256.73, 257, 301, 341.18

[56] References Cited
UNITED STATES PATENTS

| | | | |
|---|---|---|---|
| 3,339,124 | 8/1967 | Jorgensen | 317/120 |
| 3,192,447 | 6/1965 | Kenyeres | 317/119 |
| 3,618,804 | 11/1971 | Krause | 174/66 |
| 3,465,914 | 9/1969 | Pierson, Jr. | 317/119 |

Primary Examiner—Robert K. Schaefer
Assistant Examiner—Gerald P. Tolin
Attorney—Sidney G. Faber et al.

[57] ABSTRACT

A panelboard is provided with a lightweight trim plate mounted by means that are totally concealed when the cover of the trim plate is closed. This mounting means includes deflectable rails mounted to the panelboard enclosure and having hook-like formations which snap behind cooperating hook-like stiffening ribs of the trim plate to mount the latter to the enclosure. Adjusting means for operating the rails to a clamping position are concealed when the trim plate door is closed.

13 Claims, 11 Drawing Figures

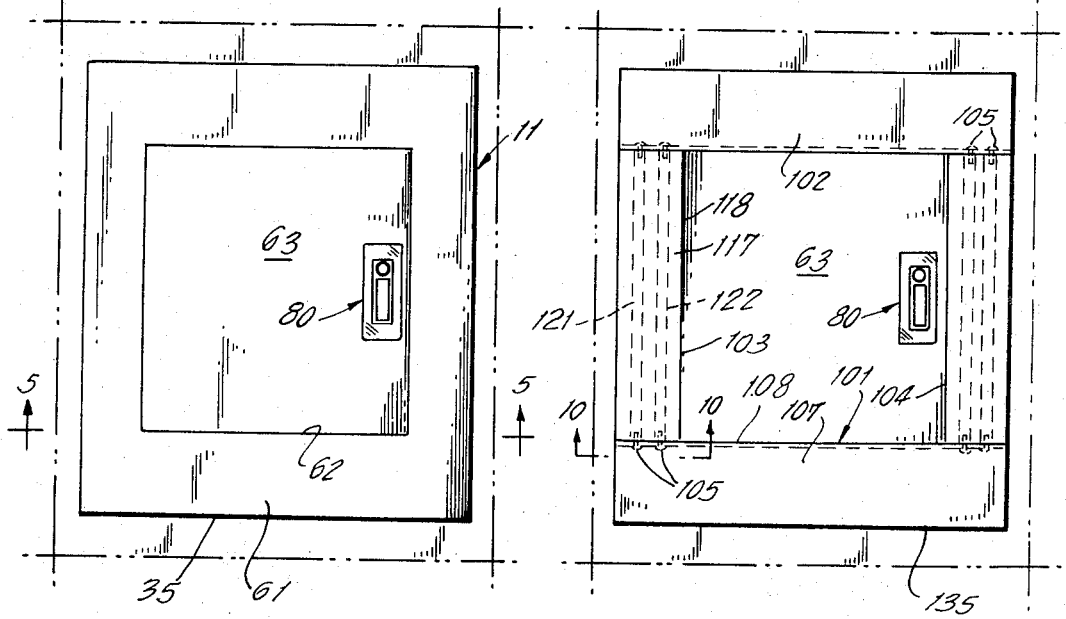
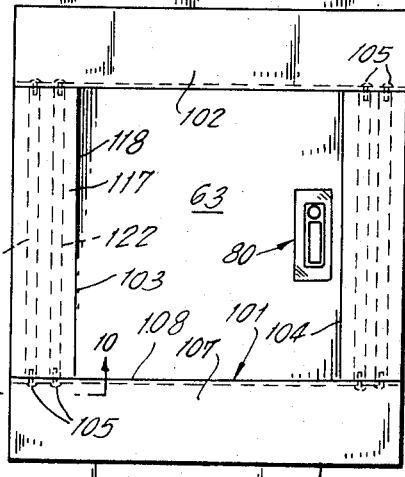
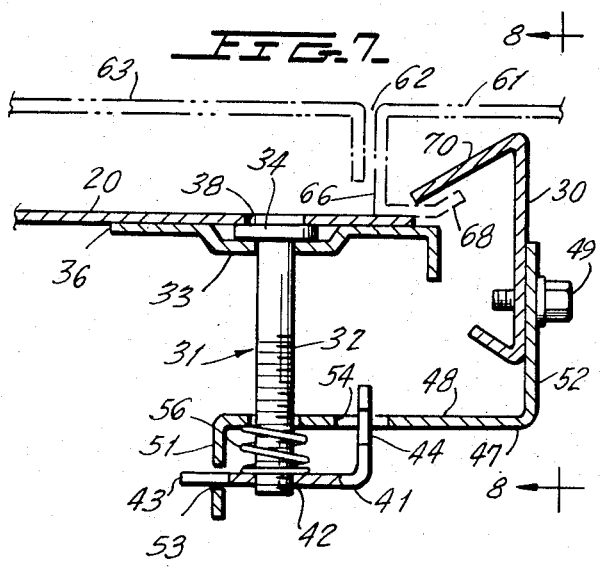
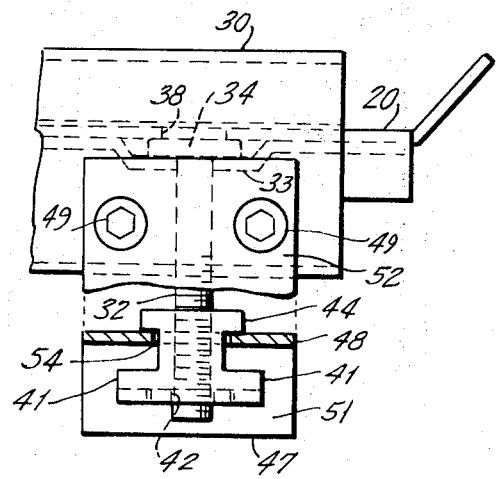
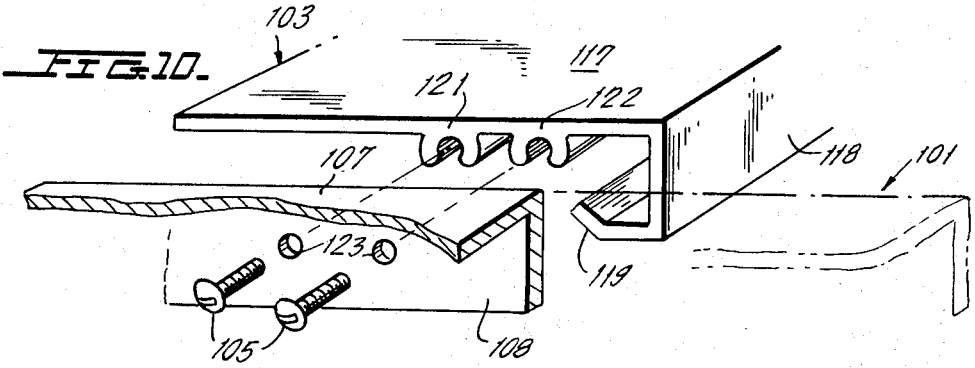

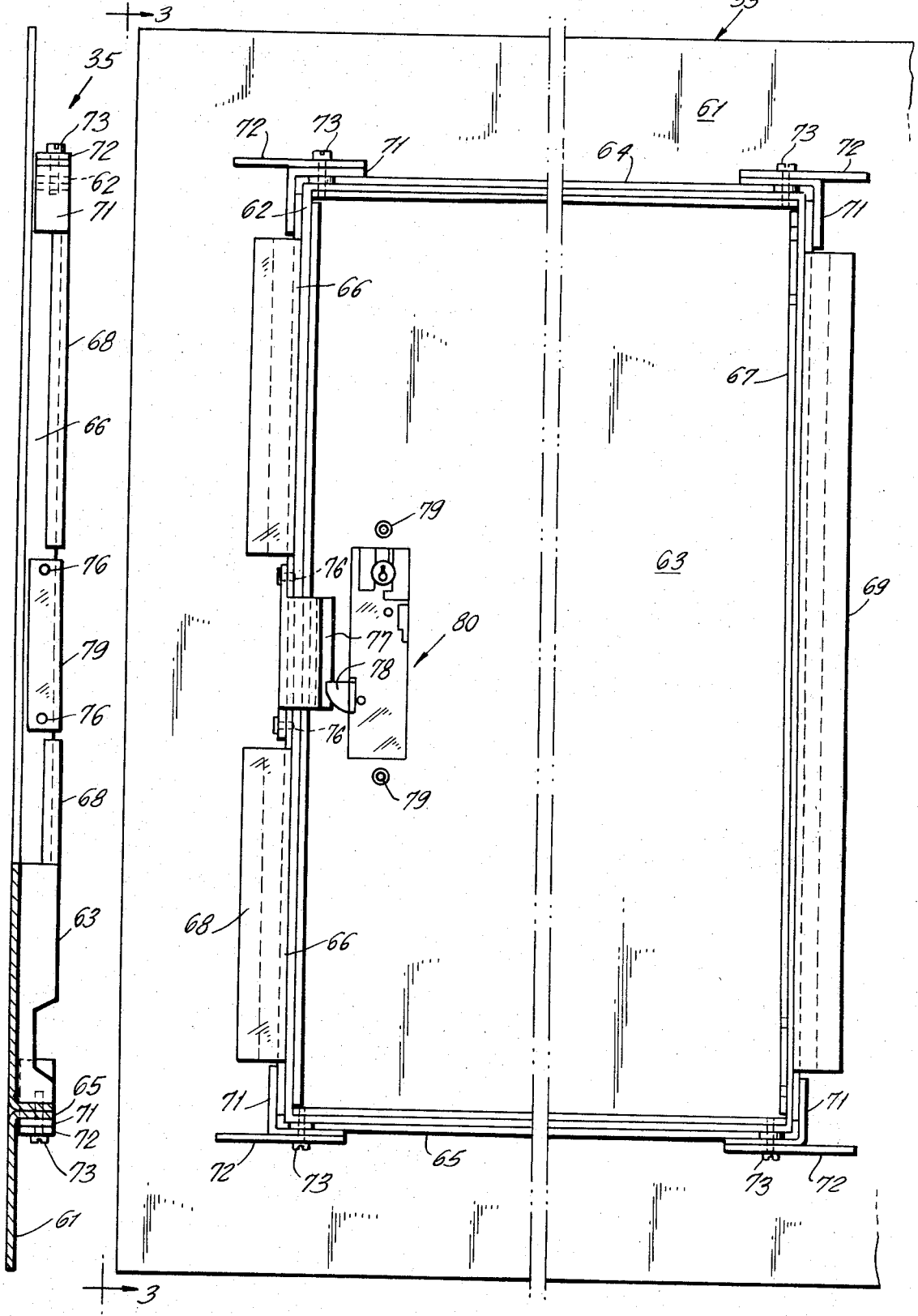

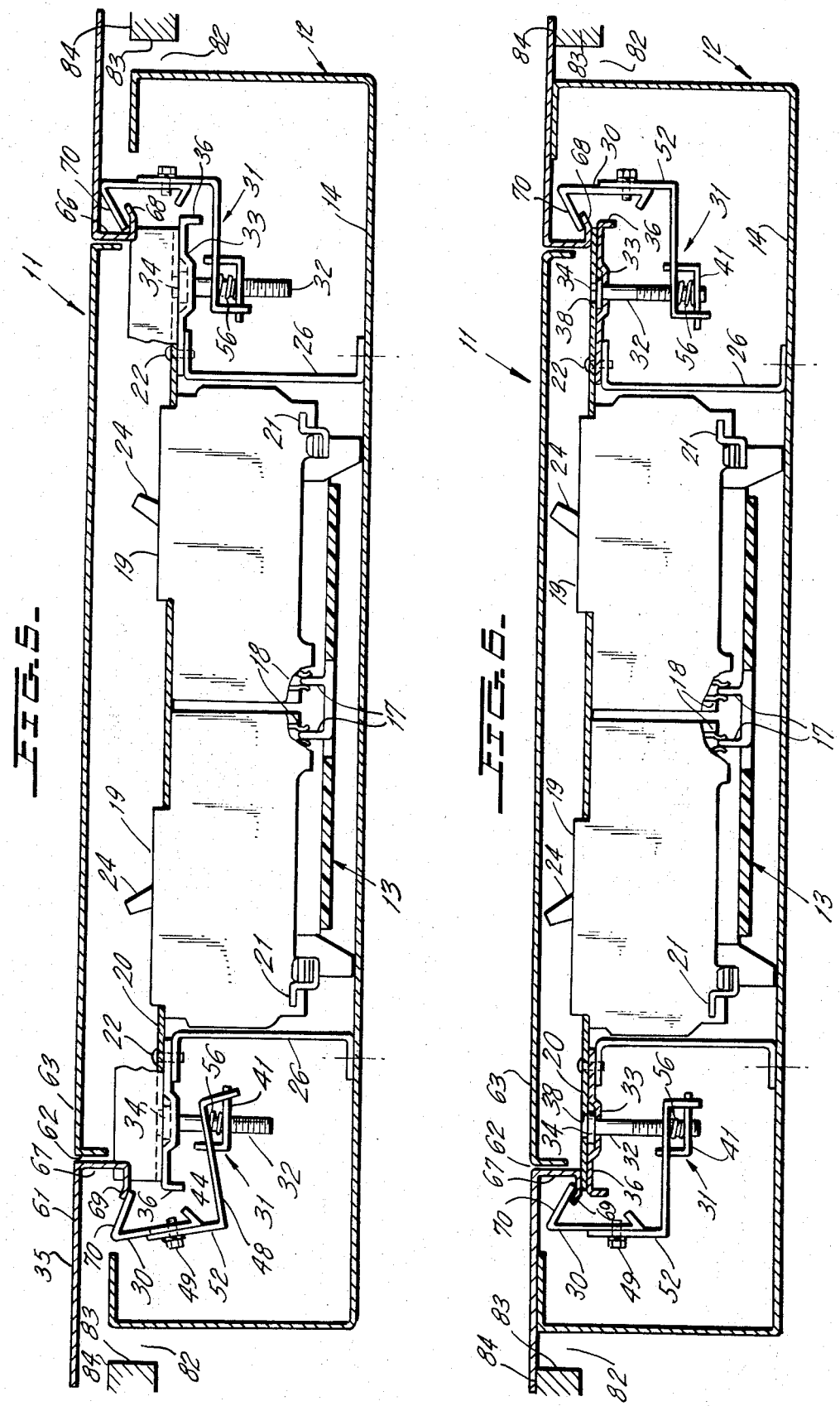

MOUNTING MEANS FOR TRIM PLATE OF PANELBOARD

This invention relates to panelboards in general and relates more particularly to panelboard trim plates and means for mounting thereof.

Panelboards for domestic and light commercial use have presented problems of security, appearance, and installation. That is, a panelboard of this type is installed through a wall opening slightly larger than the panelboard enclosure. A trim plate is provided to bridge the gap between the enclosure and the wall opening and to compensate for misalignment between the front of the enclosure and the face of the wall having the opening through which the panelboard is installed. The trim plate is usually mounted by screws that are accessible at all times, so that even if there is a lockable cover mounted to the trim plate and the cover is locked, access may be had to the interior of the panelboards by merely manipulating the trim plate mounting screws. These mounting screws also interfere with aesthetic considerations.

Installation of the prior art trim plate has proven to be troublesome when the front of the panelboard enclosure is more than slightly out of line with the exterior wall having the panelboard mounting opening in that the relatively heavy trim plate must be held in position by the installer while he attempts to locate concealed tapped holes for the many screws which secure the trim plate in its operative position.

As will hereinafter be seen, the trim plates constructed in accordance with the instant invention result in reducing weight of the trim plate by utilizing, for the most part, aluminum or lighter gauge steel than has been utilized heretofor and at the same time maintaining rigidity. Since the construction does not require welds, numerous other materials may be utilized.

In accordance with the instant invention a trim plate is constructed of preferably aluminum or relatively light gauge steel and is provided with stiffening ribs at the rear thereof. Some of these ribs are adjacent to opposite edges of the door opening in the trim plate and are shaped, in cross section, as outwardly facing hooks that are engaged behind inwardly facing hook-like projections along the free edges of outwardly deflectable holding rails mounted within the panelboard enclosure. These rails are biased inwardly toward a trim plate holding position, but are deflectable outward during mounting of the trim plate to snap behind trim plate ribs for engagement and cooperate therewith to hold the trim plate in a preliminary or loose mounting position. Thereafter an adjusting means is operated to move the rails rearward, thereby drawing the trim plate rearward until movement of the latter is arrested by engagement with the boundary portions defining the wall opening through which the panelboard is installed. The adjusting means consists of screws at opposite ends of each rail, with these screws being accessible for operation only when the trim plate door is open. Regardless of the length of each rail only two screws are required therefor.

In one embodiment of this invention, the trim plate and ribs are stamped and bent from a single piece of sheet stock, and in another embodiment of this invention the trim plate is constructed of four elements. Two of these elements are identical, with each consisting of a strip having a lip along one edge. The other two elements are identical and consist of a strip-like extrusion having three stiffening ribs. One of these ribs is along one edge of the strip and constitutes a hook-shaped holding means. The other two ribs are bifurcated, with the ends of each providing apertures to receive self-tapping screws which extend through the lips of the other elements for assembling all four elements into a unit.

Accordingly, a primary object of the instant invention is to provide simplified means for installing the trim plate of a panelboard.

Another object is to provide novel constructions of flush-type trim plates for panelboards.

Still another object is to provide novel fastening means to hold the trim plate of the panelboard, with this fastening means being accessible for operation only when the trim plate door is open.

A further object is to provide a lightweight construction for the trim plate of a panelboard.

A still further object is to provide trim plate fastening means requiring a minimal number of adjustable elements regardless of the length of the trim plate.

These objects as well as other objects of this invent,on will become invention apparent after reading the following description of the accompanying drawings in which:

FIG. 1 is a front elevation of a panelboard constructed in accordance with teachings of the instant invention.

FIG. 2 is a rear elevation of the trim plate for the panelboard of FIG. 1.

FIG. 3 is a side elevation of the trim plate of FIG. 2 looking in the direction of arrows 3—3 of FIG. 2.

FIGS. 5 and 6 are cross sections taken through line 5—5 of FIG. 1, looking in the direction of arrows 5—5. In FIG. 5 the trim plate is in the process of being mounted, and in FIG. 6 the trim plate is mounted in operative position.

Figure 4:
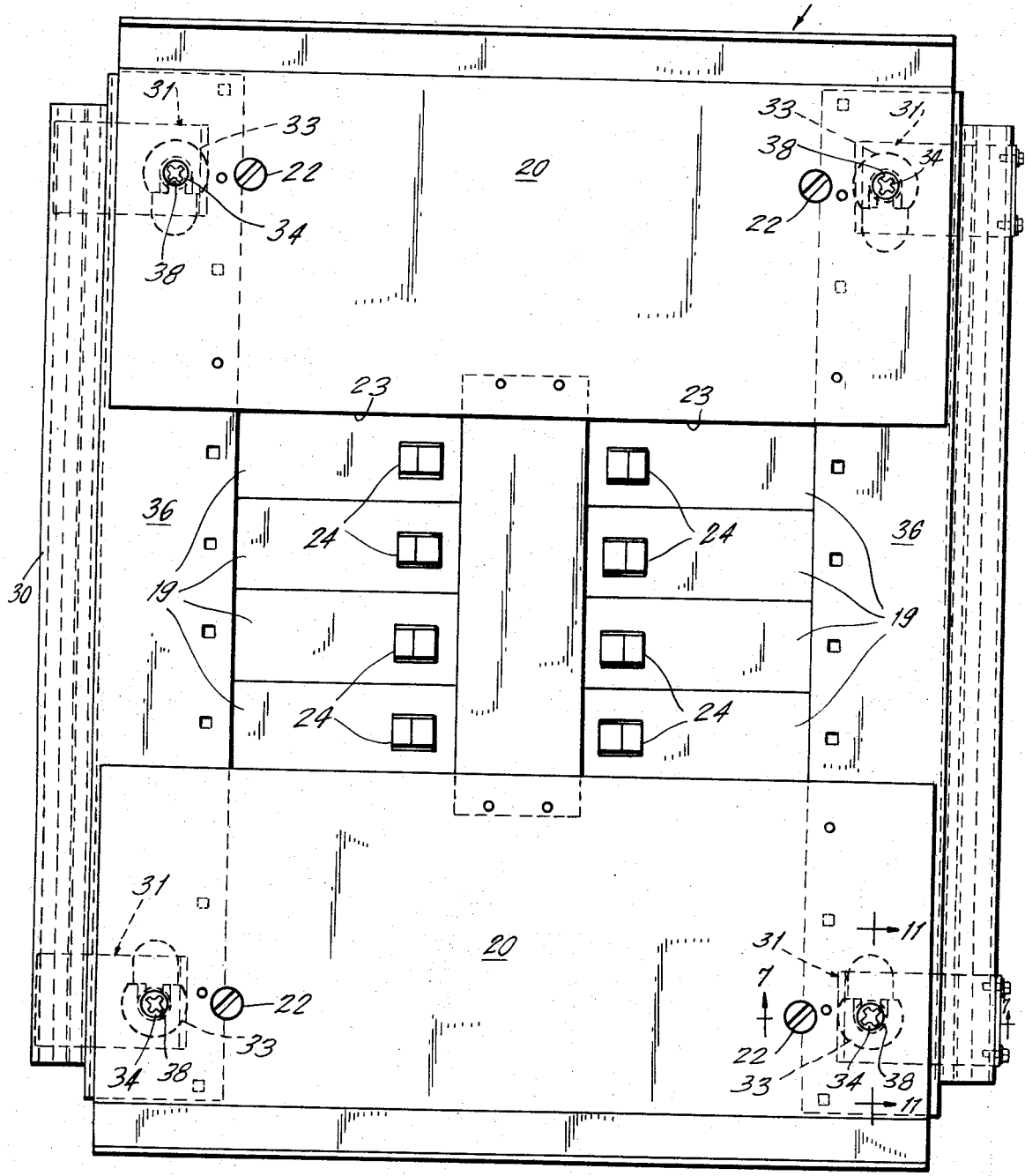
FIG. 4 is a front elevation of the panelboard interior.

FIG. 7 is a cross-section taken through line 7—7 of FIG. 4, looking in the direction of arrows 7—7.

FIG. 8 is a fragmentary side elevation, looking in the direction of arrows 8—8 of FIG. 7 and showing an adjustable element which mounts a holding rail.

FIG. 9 is a front elevation showing a second embodiment of a trim plate constructed in accordance with teachings of the instant invention.

FIG. 10 is an exploded perspective showing portions of the trim plate in the region of arrows 10—10 in FIG. 9.

Figure 11:
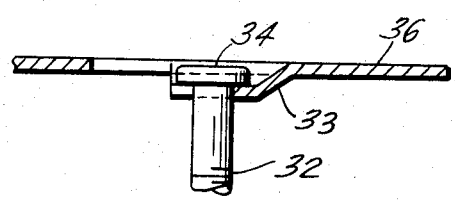

FIG. 11 is a fragmentary cross-section taken through line 11—11 of FIG. 4 looking in the direction of arrows 11—11.

Now referring to the figures. Panelboard 11 includes panlike rectangular enclosure 12 (FIGS. 4–6) wherein the interior 13 is disposed and secured to rear wall 14. Interior 13 includes line conductor 15 insulated from enclosure 12 by insulating block 16 and having male stabs 17, 17 engaged by female line terminal stabs 18, 18 of circuit breakers 19, 19 mounted end to end. The load terminal ends of circuit breakers 19, 19 are mechanically secured by cooperation with outward protrusions 21, 21 of Z-shaped elements secured along the outboard edges of insulator 16. Face plate 20 is provided with cutouts 23, 23 through which circuit breaker operating handles 24 extend so as to be manually operable. Screws 22 secure base plate 20 to the forward ends of four standoffs 26, which extend forward from rear wall 14 of enclosure 12.

Disposed along opposite edges of face plate 20 and extending for substantially the full length thereof are a pair of clamping rails 30, 30 which, as will hereinafter be seen, operatively secure face plate 35 at the front of enclosure 12. Each rail 30 is held at opposite ends thereof by a pair of mounting assemblies 31, each including an adjusting screw 32 whose head is captured at the rear of face plate 20 in the recess 34 formed by depression 33 in face plate forming vertical element 36. The head of screw 32 is positioned behind face plate aperture 38 so as to be accessible for operation from the front of face plate 20.

Assembly 31 also includes L-shaped element 41 having threaded aperture 42 in leg 43 thereof, with the other leg 44 being generally T-shaped. The other member 47 of assembly 31 includes main leg 48 having oppositely extending legs 51, 52 at opposite ends thereof. A pair of screws 49, 49 fixedly secure member 47 to rail 30. The reduced section at the free end of leg 43 extends through slightly oversized aperture 53 in leg 51, leg 44 extends through T-shaped aperture 54 of leg 48, and adjusting screw 32 extends through clearance aperture 55 in leg 48. Partly compressed coil spring 56 is mounted on adjusting screw 32 and is disposed between legs 43 and 48 to bias rail 30 inward and at the same time permit outward deflection of rail 30, for a reason to be hereinafter explained.

Trim plate 35 includes a frame-like flat portion defining interior opening 62 through which circuit breaker handles 24 and adjusting screws 32 are accessible when trim plate cover 63 is open. The portions of frame 61 bounding aperture 62 are provided with rearwardly turned lips 64–67, with lips 66, 67 being along opposite edges of aperture 62 and having rearwardly and outwardly extending formations 68, 69, respectively. At each end of lips 64, 65 there is the combination of an angle bracket 71 and a locating bar 72 both fastened by a screw 73. The screws 73 at opposite ends of lip 67 extend into the upper and lower flanges of door 63 to constitute hinges for the latter. Those screws 73 at opposite ends of lip 66 extend beyond lips 64, 65 to provide stops which limit rearward movement of door 63 upon closing thereof. Rivets 76 secure latch plate 77 to lip 66 at the center thereof where formation 68 is cut away. Latch plate 77 is in operative position to be engaged by the latch portion 78 of key operable locking means 80 mounted to door 63 by rivet 79.

In a manner well known to the art, enclosure 12 is inserted through rectangular opening 82 in wall 83 and is operatively positioned with the front of enclosure 12 flush or slightly behind exterior surface 84 of wall 83. Adjusting screws 32 are operated to move rails 30 forward, and thereafter hook-like formations 68, 69 of trim plate lips 66, 67 are pressed against cam surfaces 70 of rails 30 by a rearwardly directed force exerted against trim plate 35. Since cam surfaces 70 face inward, they act to guide lips 66, 67 to the inboard sides of rails 30. As the rearward force is applied to trim plate 35, a camming action takes place between surfaces 68, 69, 70, forcing rails 30 to deflect outward, and in doing so springs 56 are further compressed.

When the free ends of hook-like formations 68, 69 pass the free ends of cam surfaces 70 and move rearward thereof, springs 56 snap rails 30 inward, and cam surfaces 70 move in front of hook formations 68, 69 to loosely mount trim plate 35 to enclosure 12. At this time upper bars 72, 72 rest against the upper ends of rails 30 to limit downward movement of trim plate 35. Door 63 is then opened to gain access to adjusting screws 32, and the latter are operated to move assembly 31 rearward, thereby drawing frame portion 61 of trim plate 35 against exterior surface 84 of wall 83.

To dismount trim plate 35 adjusting screws 42 are operated to move rails 30 forward. Thereafter, the serviceman's fingers are moved along the front surface of the face plate 20 and behind first one and then the other of lips 66, 67 to deflect rails 30 outward past the ends of hook formations 68, 69.

In the embodiment hereinbefore described, frame 61 and its stiffening lips 64–67, as well as hook-like formations 68, 69, are integrally formed from a single piece of sheet material by a stamping operation. In another embodiment of this invention illustrated in FIGS. 9 and 10, the frame-like portion of trim plate 35 is constructed of four elongated members 101–104 secured together by eight self-tapping screws 105. Members 101, 102 are of identical construction with each having a main flat section 107 having rearwardly extending lip 108 along the inner edge thereof. Members 103, 104 are cut from the same extrusion which includes main portion 117 having rearward lip 118 along the inner edge thereof. The rear end of lip 118 is provided with outwardly facing hook-like formation 119 corresponding to hook-like formations 68, 69. Bifurcated longitudinally extending ribs 121, 122 are disposed on the rear surface of main section 117 and on the inner side of the center line thereof. The open ends of ribs 121, 122 provide recesses which receive self-tapping screws 105 which first pass through clearance apertures 123 in lip 108 of member 101. The positions of apertures 123 and ribs 121, 122 assure that main sections 107 and 117 are coplanar. Openable door 63 in the embodiment of FIG. 9 is hingedly mounted to trim plate frame portion 101-104 in essentially the same manner that cover 63 is hingedly mounted to frame portion 61.

Thus, it is seen that the instant invention provide a novel construction for a trim plate used to cover a panelboard enclosure and also provides novel means whereby installation of the trim plate is simplified. Even though this invention has been described in connection with holding rails that face outward, are biased outward and are deflectable inward, it should now be apparent to those skilled in the art that holding rails may face inward, they may be biased inward and may be deflectable outward so long as p ovisions are made for release of modified trim plate hook-like formations and release thereof.

Although in the foregoing preferred embodiments have been discussed, many variations and modifications will now become apparent to those skilled in the art and it is therefore understood that this invention is not limited by the disclosure but only by the appending claims.

The embodiments of the invention in which an exclusive privilege or property is claimed are defined as follows.

1. A panelboard including a relatively shallow rectangular enclosure having an open front; interior means having circuit protector energizing elements; said interior means mounted within said enclosure and secured to the rear wall thereof; said interior means including a removable front plate through which handles of circuit breakers mounted to said interior means extend for manual operation thereof; a trim plate having a front wall with an interior opening; said opening being smaller than said open front and in general alignment therewith, whereby circuit breaker handles extending through said front plate are accessible for operation when said trim plate is in its operative position; said trim plate extending beyond all four sides of said enclosure; mounting means for securing said trim plate to said enclosure at the front thereof; said mounting means including holding means mounted within said enclosure; said holding means including at least one elongated deflectable rail element, biasing means urging said rail element toward a holding position; elongated holding means on said trim plate engageable by said holding means, and said rail element in particular, when the latter is in said holding position, with said rail element being parallel to said elongated holding means; adjustable means accessible from inside said enclosure with said holding means and said elongated holding means engaged to selectively move said rail toward and away from said rear wall thereby operating said trim plate toward and away from said rear wall as required for installation and disassembly of the trim plate from the enclosure; said adjustable means being accessible for operation through said opening in said trim plate.

2. A panelboard as set forth in claim 1 in which the elongated holding means includes first and second rib means on the inside of the trim plate extending generally parallel to opposite boundary edges of said interior opening; said holding means also including another elongated rail element; said elements each having an inwardly turned free edge; each of said rib means having an outwardly turned free edge captured behind said free edges of said rail elements.

3. A panelboard as set forth in claim 2 in which the holding means is deflected outward from said holding position when mounting said trim plate.

4. A panelboard as set forth in claim 3 in which there is a cam means formed by the cooperation of said elements and said rib means, whereby the elements are deflected outward when mounting said trim plate.

5. A panelboard as set forth in claim 4 in which the rib means are integrally formed with said trim plate at the boundary portions of said interior opening.

6. A panelboard as set forth in claim 5 in which one of said ribs is extruded together with an elongated side portion of said trim plate and longitudinally extending stiffening rib means.

7. A panelboard as set forth in claim 5 in which there are rearwardly extending lips along other boundary portions of said interior opening.

8. A panelboard as set forth in claim 1 in which the holding means is mounted to said front plate and extends forward thereof.

9. A panelboard as set forth in claim 1 in which the rail elements and the elongated holding means are each generally hook-like in cross-section.

10. A panelboard as set forth in claim 1 in which the interior opening is the only aperture in said front wall.

11. A panelboard as set forth in claim 10 in which the front wall is void of welded connections thereto.

12. A panelboard as set forth in claim 1 in which the trim plate is constructed of aluminum.

13. A panelboard as set forth in claim 4 in which the cam means includes inwardly and rearwardly inclined surfaces along said inwardly turned free edges of said rail elements serving to guide the rib means between said rails.

* * * * *